(12) United States Patent
Mc Daid et al.

(10) Patent No.: US 12,033,152 B2
(45) Date of Patent: Jul. 9, 2024

(54) IDENTIFICATION OF MALICIOUS ACTIVITY BASED ON ANALYSIS OF TRAVEL PATH OF A MOBILE DEVICE

(71) Applicant: Adaptive Mobile Security Limited, Dublin (IE)

(72) Inventors: Cathal Mc Daid, Dublin (IE); Giulio De Vecchi, Dublin (IE)

(73) Assignee: ADAPTIVE MOBILE SECURITY LIMITED, Dublin (IE)

( * ) Notice: Subject to any disclaimer, the term of this patent is extended or adjusted under 35 U.S.C. 154(b) by 434 days.

(21) Appl. No.: 17/516,701

(22) Filed: Nov. 2, 2021

(65) Prior Publication Data

US 2022/0058654 A1 Feb. 24, 2022

Related U.S. Application Data

(63) Continuation-in-part of application No. 16/795,460, filed on Feb. 19, 2020, now Pat. No. 11,166,162.

(30) Foreign Application Priority Data

Feb. 19, 2019 (EP) .................................... 19158161

(51) Int. Cl.
*G06Q 20/40* (2012.01)
*G06Q 20/32* (2012.01)
*H04L 67/52* (2022.01)
*H04W 4/029* (2018.01)
*H04W 12/12* (2021.01)

(52) U.S. Cl.
CPC ..... *G06Q 20/4016* (2013.01); *G06Q 20/4015* (2020.05); *H04L 67/52* (2022.05); *H04W 4/029* (2018.02); *H04W 12/12* (2013.01)

(58) Field of Classification Search
CPC .......... G06Q 20/4016; G06Q 20/4015; G06Q 20/3224; H04L 67/52; H04W 4/029; H04W 12/12
See application file for complete search history.

(56) References Cited

U.S. PATENT DOCUMENTS

| 2005/0043037 | A1 | 2/2005 | Ioppe et al. |
| 2008/0162259 | A1* | 7/2008 | Patil ................... G06Q 30/0201 705/7.29 |

(Continued)

*Primary Examiner* — Joseph E Dean, Jr.
(74) *Attorney, Agent, or Firm* — Anthony G. Smyth; LOZA & LOZA, LLP

(57) ABSTRACT

A method for identification of malicious activity based on analysis of a travel path of a mobile device through multiple geographic areas includes receiving at least three location data associated with the mobile communication device, the first location data comprising indication of the geographic area of the mobile subscriber and a receipt timestamp; determining the actual travel time of the mobile subscriber from the first geographic area and the third geographic area based on a difference between timestamps of the first location data and the third location data; determining a minimum transition time for the subscriber of the mobile device to move from the first geographic area to the third geographic area; and identifying a malicious activity based on comparison of the actual travel time and the minimum transition time wherein actual travel time is less than minimum transition time between the first geographic area and the third geographic area.

1 Claim, 5 Drawing Sheets

(56) References Cited

U.S. PATENT DOCUMENTS

2014/0143536 A1    5/2014  Holland et al.
2016/0019546 A1*  1/2016  Eisen .................... G06F 21/44
                                                705/44

* cited by examiner

IDENTIFICATION OF MALICIOUS ACTIVITY BASED ON ANALYSIS OF TRAVEL PATH OF A MOBILE DEVICE

CROSS-REFERENCE TO RELATED APPLICATIONS

This application is a continuation-in-part of U.S. patent application Ser. No. 16/795,460 filed on Feb. 19, 2020, and claims priority to and the benefit of European Patent Application No. EP 19158161.0 filed on Feb. 19, 2019, the disclosure of which applications being incorporated herein by reference in their entirety for all applicable purposes.

FIELD

Method and system for identification of malicious activity based on analysis of a travel path of a mobile device of a mobile subscriber moving through a plurality of geographic areas.

BACKGROUND

A known weakness in SS7 (Signalling System No. 7) is the possibility for an attacker to pose as a legitimate network node and engage other nodes in SS7 TCAP communication sessions, receiving privileged data from these nodes, or sending them new, incorrect or malicious data.

These kinds of weaknesses are known and have been (and still are) subject to extensive research. Many of these attacks which exploit these weaknesses can be called "deterministic attacks" as there is a clear way to describe, identify and stop them. However, there are other kinds of attacks that can be defined at a "higher level", in the sense that all the packets involved in the communication are "admissible", i.e. they do not trigger any alarm for the classic algorithms, but are nevertheless anomalous when analysed as a whole.

An example of this kind of "higher level" attack, together with an algorithm to identify them. The attack is to 'spoof' the location of a subscriber—to somewhere where the physical subscriber and phone are not actually present. By spoofing that the subscriber's phone is at a location under the control of a malicious entity, subsequent communications and signalling to the subscriber would be sent to this malicious location, and then be intercepted. The spoofing attack could also be a form of Denial of Service, if the location is spoofed to be anywhere other than where the subscriber is, then subsequent communications to the subscriber go unanswered. US Patent publication number US2015/186891, assigned to Visa International Service Association, discloses a system and method for performing location based fraud detection. The system disclosed requires a dedicated third party server that polls a network to identify different mobile devices and requires the GPS coordinates of each device for making calculations, as well as requiring a transaction to take place from the mobile device. Chinese Patent Publication number CN106228799, assigned to Fujian Information Tech Co Led, discloses a system and method for monitoring illegal tampering of vehicle location information.

Thus, there is a need for a method and system for preventing and detecting such attacks by the identification of malicious mobile devices in a network.

SUMMARY

Embodiments of the present invention, as set out in the appended claims, are directed to a system and method for identification of malicious activity based on analysis of a travel path of a mobile device of a mobile subscriber moving through a plurality of geographic areas, where the malicious activity is at least one received spoofed location data. An important aspect of the invention is that the solution analyses and compares all possible permutations of travel between geographic areas to accurately and quickly detect a malicious or fraudulent activity. The system and method of the invention does not need to query each device to determine current location data or require a third party server infrastructure that is required to collect and infer location data of each mobile device. Instead the system and method only requires mobile device location data using existing telecom protocols automatically available at a network switch or mobile switching centre. Moreover, the invention can operate and detect a malicious device before a fraudulent transaction takes place by analysing the travel path of a mobile device, as set out in the appended claims.

Such malicious activity is detected if the mobile subscriber is moving too fast through the travel path i.e. the analysis of the location data suggests a travel path and the timestamps of such received packets aids in determination as to whether such movement through the travel path is plausible or not. The above mentioned geographic area is a predefined area which may be defined by the boundaries of a country, state, or town.

The method of analysis of a travel path of a mobile device of a mobile subscriber comprises the steps of a) receiving "n" number of location data associated with said mobile device, each of "n" location data comprising an indication of the geographic area of the mobile subscriber $G_n$ and a receipt timestamp $T_n$; b) determining the actual travel time $t_{actual}$ of the mobile subscriber from a geographic area $G_n$ and a subsequently visited geographic area $G_{n+a}$ based on a difference between timestamps $T_n$ and $T_{n+a}$, wherein $a \geq 2$;

c) determining a minimum transition time $t_{min}$ for the subscriber of the mobile device to move from the geographic area $G_n$ to the subsequently visited geographic area $G_{n+a}$; and d) identifying a malicious activity based on comparison of the actual travel time $t_{actual}$ and the minimum transition time $t_{min}$ wherein $t_{actual} < t_{min}$. In another embodiment, the method above described method steps b), c) and d) are repeated for the first "n–a" location data.

In an exemplary embodiment the method of detecting a suspicious transition of a mobile communication device transitioning through at least three geographic areas i.e. where n=3 and a=2 comprises the following steps: a) receiving at least three location data associated with said mobile communication device, said first location data comprising indication of the geographic area of the mobile subscriber and a receipt timestamp; b) determining the actual travel time of the mobile subscriber from the first geographic area and the third geographic area based on a difference between timestamps of the first location data and the third location data; c) determining a minimum transition time for the subscriber of the mobile device to move from the first geographic area to the third geographic area; and d) identifying a malicious/suspicious activity based on comparison of the actual travel time and the minimum transition time wherein actual travel time is less than minimum transition time between the first geographic area and the third geographic area.

In one embodiment there is provided a mobile switching centre for identification of malicious activity based on analysis of a travel path of a mobile device of a mobile subscriber moving through a plurality of geographic areas said comprising:

a processor;
a memory operatively coupled to the processor; and
a transceiver operatively coupled to the processor;
said processor configured to:
receive at least three location data associated with said mobile communication device, said first location data comprising indication of the geographic area of the mobile subscriber and a receipt timestamp;
determine the actual travel time of the mobile subscriber from the first geographic area and the third geographic area based on a difference between timestamps of the first location data and the third location data;
determine a minimum transition time for the subscriber of the mobile device to move from the first geographic area to the third geographic area; and
identify a suspicious activity based on comparison of the actual travel time and the minimum transition time wherein actual travel time is less than minimum transition time between the first geographic area and the third geographic area through the second geographic area.

In one embodiment of the invention the method and system is embodied as a banking application to detect fraud or a suspicious transaction. For example, a duplicated/stolen credit/debit card is used by a fraudster to buy goods in different locations. The legitimate user will continue to use his card for normal transactions. If the sell points associate timestamp and geographic data to the transactions, it is possible to determine if different transactions were made at distances that are physically impossible to have been covered in the given time (because both the legitimate and the fraudster(s) are using the card from different locations).

In this case the invention is implemented as a software in the service that gets accessed. In one application stolen login credentials of a user are distributed across one or more fraudster. The legitimate user and the fraudster(s) will be accessing the given service. By using the geolocation of the IP address from which the logins are executed and the login time, it is possible to determine the path of such logins. The invention will cover the case where even if the single steps are admissible (the moving between different areas determined by IP geolocation), where one or more of the multi-steps are physically not admissible.

Another embodiment of the invention is implemented in tracking systems in cars or containers, or any other sort of tracked piece of physical equipment. For example, if the tracking identify of the real piece of equipment is being faked or is being tampered with the invention can be implemented to detect suspicious activity. This can be done by determining if multi-steps are physically not admissible then a security solution would be aware something suspicious is occurring by calculating and analysing the various travel paths.

In one embodiment the geographical area is one of a country, state, town.

In one embodiment the geographical area is a partition in a predetermined map with predetermined partitioned geographical areas.

In one embodiment the system and method can operate using one or more telecommunication protocols. The invention works on the principle that each protocol can easily determine subscriber information and location of each mobile device in a network.

In one embodiment the invention can use one or more of the following protocols: SS7, Diameter, 5G, GTP, ISUP, SIP or other telecommunication protocols used for control or information exchange.

In one embodiment the step of comparing an identification of a suspicious activity obtained from a first protocol with an identification of a suspicious activity obtained from a second protocol to correlate whether an activity is malicious.

Thus, by analyzing the monitoring of the path of travel of the subscriber such malicious activity is detected.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
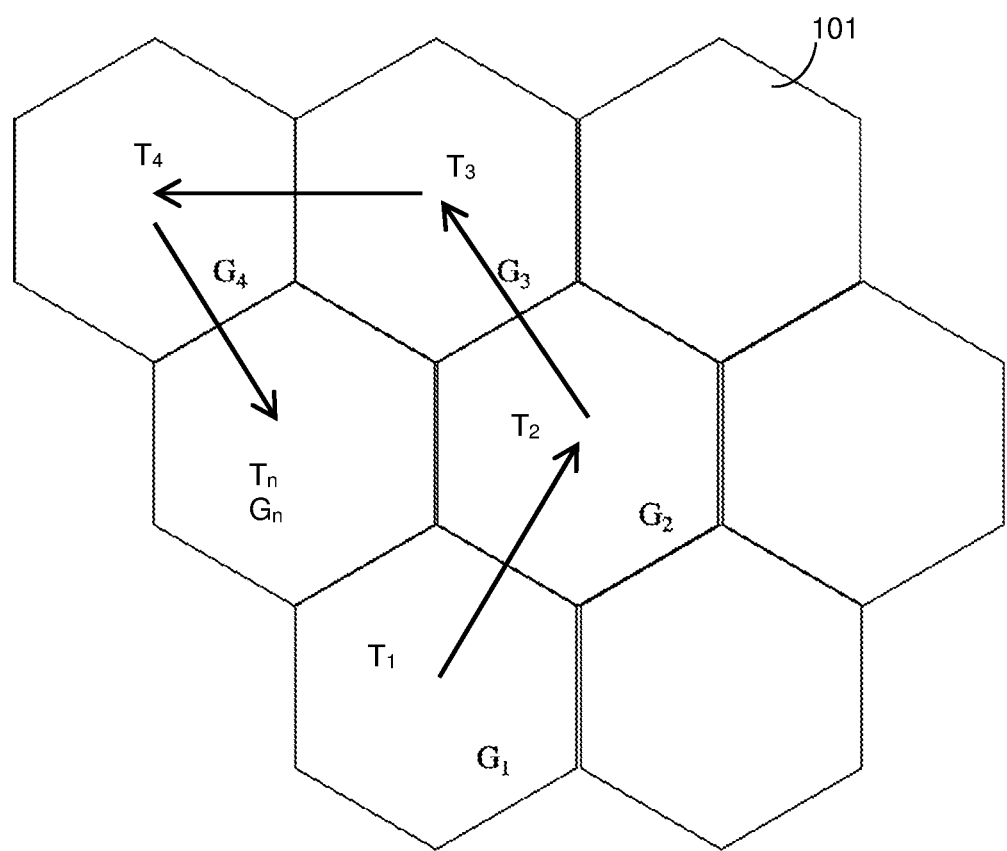
FIG. 1 exemplarily illustrates a travel path of a mobile subscriber in accordance with some embodiments of the present invention.

FIG. 1 exemplarily illustrates a travel path of a mobile subscriber in accordance with some embodiments of the present invention. Each hexagonal area represented in FIG. 1 is a predefined geographic area e.g. the hexagonal area represented labelled as 101.

The mobile device of the subscriber sends location data when a subscriber registers to a mobile phone network of the geographic area. For example, in pre-existing telecom protocols, there are specific packets that indicates an update/change in the current location of a subscriber. The following list is an example, without presumption of being exhaustive, of such packets: in SS7 Protocol—UpdateLocation, UpdateLocationGPRS, optionally SendAuthenticationInfo may be used; in Diameter (4G) protocol—Update-Location-Request packets and in 5G—equivalent packets. Other location data can also be used. For example, the protocols that the method and system of the invention can use comprises one or more of the following protocols: SS7, Diameter, 5G, GTP (data), ISUP (voice), SIP (voice). For illustrative purposes the SS7 protocol is described in more detail below.

These packets contain a field that can indicate what geographic area the subscriber is in. For SS7, this field could be a Global Title (GT), which is a form of a phone number that indicates what network node the subscriber's phone is currently registered to. Location information can be derived from the numbering plan of the network node's GT. For example, if an UpdateLocation packet was received with a Source or registered GT field of +353861234567, then by analysing the Telephone Country Code +353, a system would know that the node was based in Ireland.

For Diameter this could be a Host or Realm address field, which indicates what network node or network the subscriber's phone is currently registered to. For example, if an UpdateLocation-Request packet was received with a source or registered Host or Realm address that contained MCC 272, then by analysing the Mobile Country Code 272, a system would know that the node was based in the geographic area of Ireland.

Equivalent analysis could be performed on other packets within these protocols, or on packets within new protocols, but the basis is to take information from the received packet, to infer what geographic areas the subscriber's phone is currently or purportedly based in.

The unit of geographic area does not have to strictly be based on a country level, if the received information allows a smaller geographic area to be determined, then that could be used. For example, an SS7 UpdateLocation packet could be received with a source or registered GT of +1 (907) 123 4567. Then by analysing the Telephone Country Code +1 (US) and the area code (907) Alaska, a system would know that the node was based in Alaska, United States. This information could come both from public sources, or if the internal network node information of an operator is available to the system.

In an embodiment, any Telecom signalling packet that indicates or updates a subscriber location, which can be matched to a geographic area, can be used to indicate a change of geographic area, and can be compared against the previous geographic areas.

Therefore, any location data in accordance with the claimed invention may comprise any data packet or signal which may be used to determine the geographic area within which a mobile phone is located. Also, the time of receipt of said data packet or signal may be used as the timestamp.

Thus FIG. 1 exemplarily illustrates a mobile subscriber moving through the geographic areas i.e. the mobile device of the subscriber transmits a first location data at time $T_1$ when the subscriber is within the geographical area $G_1$. Similarly, the mobile phone of the subscriber transmits a second location data at time $T_2$ when the subscriber is within the geographical area $G_2$. Similarly, the mobile phone of the subscriber transmits a third location data at time $T_3$ when the subscriber is within the geographical area $G_3$. To avoid further repetition, the $n^{th}$ location data is transmitted by the mobile device of the subscriber at time $T_n$ when the subscriber is within the geographical area $G_n$.

Figure 2:
FIG. 2 exemplarily illustrates a travel path of a mobile subscriber in accordance with some embodiments of the present invention.

FIG. 2 is similar to FIG. 1 exemplarily illustrates a travel path of a mobile subscriber where the geographic areas through which a subscriber travels are countries of Europe.

Figure 3:
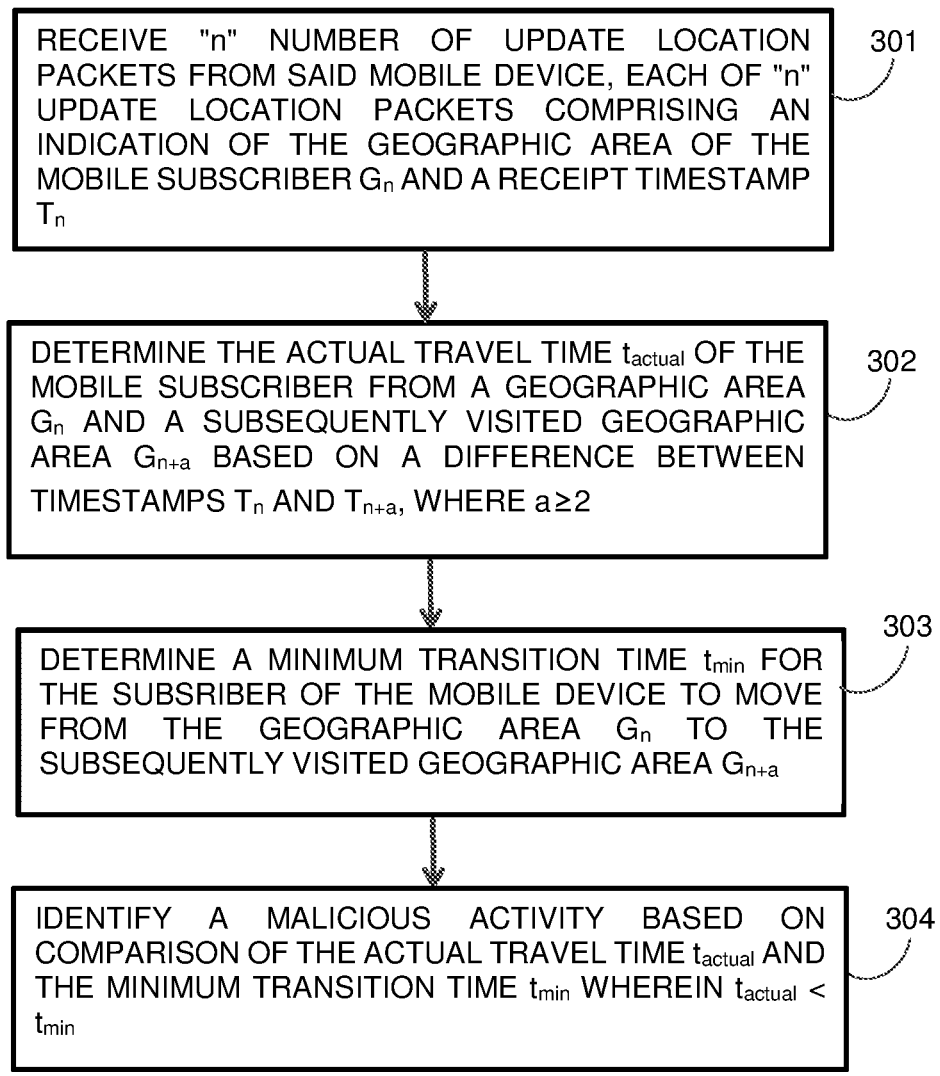
FIG. 3 is a flow chart illustrating an embodiment of the inventive method for identification of malicious activity based on analysis of a travel path of a mobile device of a mobile subscriber moving through a plurality of geographic areas.

FIG. 3 is a flow chart illustrating an embodiment of the inventive method for identification of malicious activity based on analysis of a travel path of a mobile device of a mobile subscriber moving through a plurality of geographic areas which is explained below with reference to FIG. 1 and FIG. 2.

The method of analysis of a travel path of a mobile device of a mobile subscriber comprises the steps of:
a) receiving 301 "n" number of location data associated with said mobile device, each of "n" location data comprising an indication of the geographic area of the mobile subscriber $G_n$ and a receipt timestamp $T_n$. As mentioned above and illustrated in FIG. 1 and FIG. 2 "n" number of location data are received e.g. the first packet at time $T_1$ which comprises an indication for geographical area $G_1$ . . . and a $n^{th}$ packet received at time $T_n$ which comprises an indication for geographical area $G_n$.
b) determining 302 the actual travel time $t_{actual}$ of the mobile subscriber from a geographic area $G_n$ and a subsequently visited geographic area $G_{n+a}$ based on a difference between timestamps $T_n$ and $T_{n+a}$, wherein $a \geq 2$. For example, the actual travel time of the subscriber from the geographical area $G_1$ ($G_n$ for n=1) to $G_3$ ($G_{n+a}$ at n=1 and a=2) is $T_3-T_1$. Therefore, $t_{actual}=T_{n+a}-T_n$.
c) determining 303 a minimum transition time $t_{min}$ for the subscriber of the mobile device to move from the geographic area $G_n$ to the subsequently visited geographic area $G_{n+a}$ through the path followed from $G_n$ to $G_{n+a}$ (i.e. a sum transition times between each $G_n$ to $G_{n+1}$ . . . to $G_{n+a}$).

In an embodiment the $t_{min}$ between two geographical area may be computed as per the following process in accordance with some of the embodiments of the present invention.
I) generating a database of geographical data, containing the description of the shape of geographic area objects for each geographic unit or location (e.g. each country in the world). This geographic shape object could be defined in a series or ways, at a minimum it could be a bounding box encompassing the country, but equally it could be a more accurate country bounding polygon, all the way to a fully accurate country shape with every border point modelled.
II) estimating the minimum admissible travelling time between two geographical areas (e.g. countries). This is based on:
 i. Finding the minimum distance between the defined geographic areas for all the possible couples of countries (if they are overlapping or bordering, then the distance is 0). The minimum distance between the two countries may be computed using Haversine Distance or Great Circle Distance;
 ii. The estimated maximum speed of a typical passenger aircraft is obtained using statistical analysis of various speeds of passenger aircrafts.
 iii. Combining these distance and speed, estimating the minimum admissible travelling time $t_{min}$ between geographic areas.
d) identifying 304 a malicious activity based on comparison of the actual travel time $t_{actual}$ and the minimum transition time $t_{min}$ wherein $t_{actual} < t_{min}$.

In an exemplary embodiment the method of detecting a suspicious transition of a mobile communication device transitioning through at least three geographic areas $G_1$, $G_2$ and $G_3$ i.e. where n=3 and a=2 comprises the following steps:
a) receiving at least three location data associated with said mobile communication device, said first update packet each packet comprising indication of the geographic area $G_1$ of the mobile subscriber and a receipt timestamp $T_1$;
b) determining the actual travel time $t_{actual}$ of the mobile subscriber from the first geographic area $G_1$ and the third geographic area $G_3$ based on a difference between timestamps of the first location data $T_1$ and the third location data $T_3$.

c) determining a minimum transition time $t_{min}$ for the subscriber of the mobile device to move from the first geographic area $G_1$ to the third geographic area $G_3$ through the second geographical area $G_2$; and d) identifying a malicious/suspicious activity based on comparison of the actual travel time $t_{actual}$ and the minimum transition time $t_{min}$ wherein actual travel time is less than minimum transition time between the first geographic area and the third geographic area.

In a preferred embodiment, the method above described method steps b), c) and d) are repeated for the first "n-a" location data, i.e. iterating through a=2, 3 . . . "n-a".

The following exemplarily shows the working of the above inventive method in accordance with a preferred embodiment of the present invention. The below example is not limiting and solely for the purpose of showing the working of the inventive method in the form of an example.

A subscriber is moving through contiguous countries. It will be appreciated that the invention can operate equally as well for non-contiguous regions where the regions do not necessarily need to bound each other. In the following example the contiguous path is:
1. Hungary-Austria
2. Austria-Germany
3. Germany-Switzerland
4. Switzerland-France So, the total path is Hungary-Austria-Germany-Switzerland-France

| #Step | Movement | Time (in minutes) |
|---|---|---|
| 1 | Hungary—Austria | 4 m |
| 2 | Austria—Germany | 9 m |
| 3 | Germany—Switzerland | 5 m |
| 4 | Switzerland—France | 2 m |

It will be appreciated that all of the above are single-step transitions which are at present evaluated individually. The present invention makes use of that fact that multiple locations can be evaluated.

The following would be evaluated in accordance to the above described inventive method:

It is observed that the trajectory of this subscriber is implausible and therefore suspicious and indicating a malicious activity.

Figure 4:
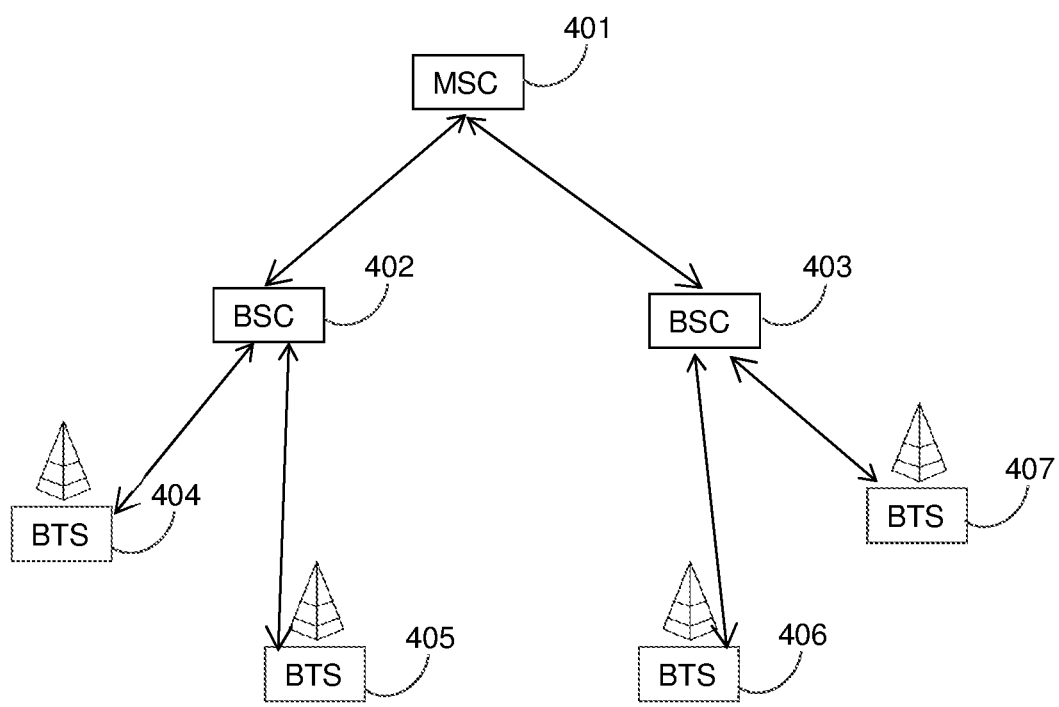
FIG. 4 is a diagram illustrating an architecture of a mobile telephone network, in accordance with some embodiments of the present invention.

FIG. 4 is a diagram illustrating a general architecture of a mobile telephone network, in accordance with some embodiments of the present invention. Base Transceiver Stations (BTS) 404, 405 and 406, 407 are in communication with respective Base Station Controllers (BSC) 402 and 403. The BSC controls and manages the BTSs and performs essential functions like routing and handoffs. Further, the BSCs 402, 403 are in communication with the Mobile Switching Centre (MSC) 401 which is responsible for overall management for roaming of the subscriber to different geographical areas.

Figure 5:
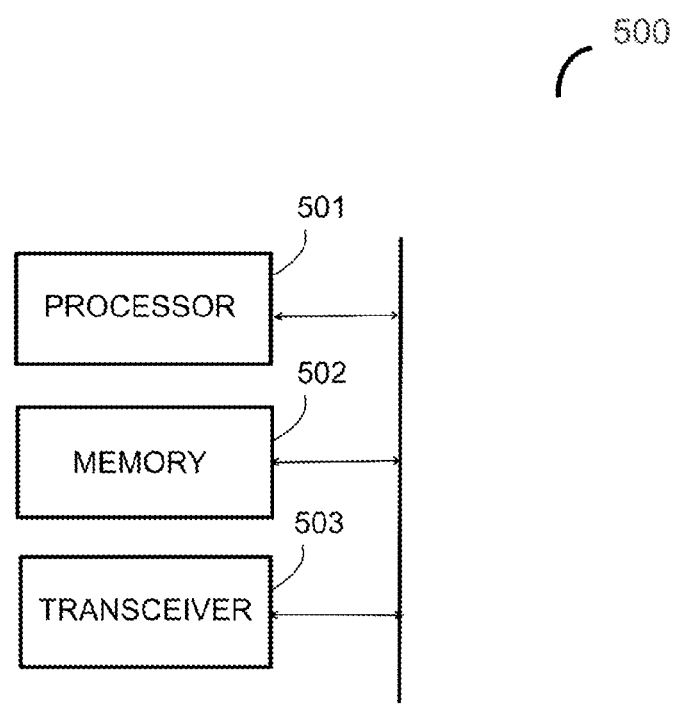
FIG. 5 is a functional block diagram illustrating the primary components of a mobile switching centre (MSC) for identification of malicious activity based on analysis of a travel path of a mobile device of a mobile subscriber moving through a plurality of geographic areas in accordance with some embodiments of the present invention.

FIG. 5 is a functional block diagram illustrating the primary components of a MSC 401, 500 for identification of malicious activity based on analysis of a travel path of a mobile device of a mobile subscriber moving through a plurality of geographic areas in accordance with some embodiments of the present invention. The MSC comprises a processor 501, a memory 502 operatively coupled to the processor 501; and a transceiver 503 operatively coupled to the processor 501. The processor 501 configured to receive "n" number of location data associated with said mobile device through said transceiver 503, each of "n" location data comprising an indication of the geographic area of the mobile subscriber $G_n$ and a receipt timestamp $T_n$. The processor 501 determines the actual travel time $t_{actual}$ of the mobile subscriber from a geographic area $G_n$ and a subsequently visited geographic area $G_{n+a}$ based on a difference between timestamps $T_n$ and $T_{n+a}$, where a≥2.

The processor further determines a minimum transition time $t_{min}$ for the subscriber of the mobile device to move from the geographic area $G_n$ to the subsequently visited geographic area $G_{n+a}$ by computing the distance of the path of travel from $G_n$ to $G_{n+a}$ (i.e. a sum transition time between each $G_n$ to $G_{n+1}$ . . . to $G_{n+a}$). In another embodiment the determination of a minimum transition time $t_{min}$ is based on looking up a database stored in memory 502.

The processor 501 finally identifies a malicious activity based on comparison of the actual travel time $t_{actual}$ and the minimum transition time $t_{min}$ wherein $t_{actual} < t_{min}$. The malicious activity is at least one received spoofed location data.

| #Step | Movement | Type | Actual Time $t_{actual}$ (in minutes) | Minimum travel time $t_{min}$ (in minutes) | Is it an admissible movement? |
|---|---|---|---|---|---|
| 1 + 2 | Hungary—Austria—Germany | 2-step (n = 5 and a = 2) | 4 + 9 = 13 m | 5 m | Yes |
| 2 + 3 | Austria—Germany—Switzerland | 2-step (n = 5 and a = 2) | 9 + 4 = 14 m | 0 m | Yes |
| 3 + 4 | Germany—Switzerland—France | 2-step (n = 5 and a = 2) | 5 + 2 = 7 m | 0 m | Yes |
| 1 + 2 + 3 | Hungary—Austria—Germany—Switzerland | 3-step (n = 5 and a = 3) | 4 + 9 + 5 = 18 m | 25 m | No |
| 2 + 3 + 4 | Austria—Germany—Switzerland—France | 3-step (n = 5 and a = 3) | 9 + 5 + 2 = 16 m | 0 m | Yes |
| 1 + 2 + 3 + 4 | Hungary—Austria—Germany—Switzerland—France | 3-step (n = 5 and a = 4) | 4 + 9 + 5 + 2 = 20 m | 29 m | No |

Further, the processor is configured to recursively perform the above functions for the first "n–a" location data i.e. iterating through a=2, 3 . . . "n–a".

In an exemplary embodiment the processor 501 detects a suspicious transition of a mobile communication device transitioning through at least three geographic areas $G_1$, $G_2$ and $G_3$ i.e. where n=3 and a=2. The processor 501 receives at least three location data associated with said mobile communication device, said first update packet each packet comprising indication of the geographic area of the mobile subscriber and a receipt timestamp. Further, the processor 501 determines the actual travel time of the mobile subscriber from the first geographic area and the third geographic area based on a difference between timestamps of the first location data and the third location data.

Further, the processor determines a minimum transition time for the subscriber of the mobile device to move from the first geographic area to the third geographic area through the second geographic area and the processor 501 identifies a malicious activity based on comparison of the actual travel time and the minimum transition time wherein actual travel time is less than minimum transition time between the first geographic area and the third geographic area through the second geographic area.

In another exemplary embodiment the method and system is embodied as a banking application to detect fraud or a suspicious transaction. For example, a duplicated/stolen credit/debit card is used by a fraudster to buy goods in different locations. The legitimate user will continue to use his card for normal transactions. If the sell points associate timestamp and geographic data to the transactions, it is possible to determine if different transactions were made at distances that are physically impossible to have been covered in the given time (because both the legitimate and the fraudster(s) are using the card from different locations).

In this case the invention is implemented as a software in the service that gets accessed. In one application stolen login credentials of a user are distributed across one or more fraudster. The legitimate user and the fraudster(s) will be accessing the given service. By using the geolocation of the IP address from which the logins are executed and the login time, it is possible to determine the path of such logins. The invention will cover the case where even if the single steps are admissible (the moving between different areas determined by IP geolocation), where one or more of the multi-steps are physically not admissible.

In another exemplary embodiment the method and system is implemented in tracking systems in cars or containers, or any other sort of tracked piece of physical equipment. For example, if the tracking identify of the real piece of equipment is being faked or is being tampered with the invention can be implemented to detect suspicious activity. This can be done by determining if multi-steps are physically not admissible then a security solution would be aware something suspicious is occurring by calculating and analysing the various travel paths.

Further, a person ordinarily skilled in the art will appreciate that the various illustrative logical/functional blocks, modules, circuits, techniques/algorithms and process steps described in connection with the embodiments disclosed herein may be implemented as electronic hardware, or a combination of hardware and software. To clearly illustrate this interchangeability of hardware and a combination of hardware and software, various illustrative components, blocks, modules, circuits, and steps have been described above generally in terms of their functionality. Whether such functionality is implemented as hardware or a combination of hardware and software depends upon the design choice of a person ordinarily skilled in the art. Such skilled artisans may implement the described functionality in varying ways for each particular application, but such obvious design choices should not be interpreted as causing a departure from the scope of the present invention.

The process described in the present disclosure may be implemented using various means. For example, the process described in the present disclosure may be implemented in hardware, firmware, software, or any combination thereof. For a hardware implementation, the processing units, or processors(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, software codes may be stored in a memory and executed by a processor. Memory may be implemented within the processor unit or external to the processor unit. As used herein the term "memory" refers to any type of volatile memory or nonvolatile memory.

Furthermore, although elements of the invention may be described or claimed in the singular, the plural is contemplated unless limitation to the singular is explicitly stated.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for analysis of a travel path of a mobile device of a mobile subscriber moving through a plurality of geographic areas where a banking application detects fraud or a suspicious transaction associated with the subscriber, the method comprising: a) receiving "n" number of location data associated with said mobile device, each of "n" location data comprising an indication of the geographic area of the mobile subscriber Gn and a receipt timestamp Tn; b) determining the actual travel time tactual of the mobile subscriber from a geographic area Gn and a subsequently visited geographic area Gn+a based on a difference between timestamps Tn and Tn+a, wherein a>2; c) determining a minimum transition time tmin for the subscriber of the mobile device to move from the geographic area Gn to the subsequently visited geographic area Gn+a through the travel path; d) comparing the actual travel time tactual and the minimum transition time tmin wherein tactual<tmin; and e) identifying a suspicious activity based on said comparison wherein the suspicious activity is at least one received spoofed location data wherein the suspicious activity is a fraud or a suspicious transaction associated with a bank card or account of the subscriber.

* * * * *